United States Patent
Amann et al.

[11] Patent Number: 5,142,941
[45] Date of Patent: Sep. 1, 1992

[54] WIPER SYSTEM

[75] Inventors: Eugen Amann, Besigheim; Peter Baumgarten, Coburg; Thomas Helh, Bietigheim-Bissingen; Eckhardt Schmid, Brackenheim, all of Fed. Rep. of Germany

[73] Assignee: SWF Auto-Electric GmbH, Bietigheim-Bissingen, Fed. Rep. of Germany

[21] Appl. No.: 585,153

[22] PCT Filed: Feb. 6, 1990

[86] PCT No.: PCT/EP90/00191
§ 371 Date: Nov. 8, 1990
§ 102(e) Date: Nov. 8, 1990

[87] PCT Pub. No.: WO90/09299
PCT Pub. Date: Aug. 23, 1990

[30] Foreign Application Priority Data
Feb. 10, 1989 [DE] Fed. Rep. of Germany ....... 3003976

[51] Int. Cl.⁵ .................. F16H 57/02; A47L 1/02
[52] U.S. Cl. ................... 74/606 R; 15/250.30; 15/250.31; 74/42; 188/378; 248/636; 267/136
[58] Field of Search ............ 74/42, 43, 606 R; 248/636; 188/378, 268; 267/136; 15/250.30, 250.31

[56] References Cited

U.S. PATENT DOCUMENTS

| | | | |
|---|---|---|---|
| 1,747,284 | 2/1930 | Berill | 15/250.31 X |
| 1,812,918 | 7/1931 | Aufiero | 15/250.30 |
| 1,828,713 | 10/1931 | Hueber | 15/250.31 X |
| 1,839,175 | 12/1931 | Hueber | 15/250.30 |
| 1,913,308 | 6/1933 | Hueber et al. | 15/250.30 |
| 2,670,492 | 3/1954 | Boothby et al. | 15/253 |
| 3,188,644 | 6/1965 | Sielaff | 188/378 X |
| 4,507,980 | 4/1985 | Nishiyama et al. | 188/378 X |
| 4,706,788 | 11/1987 | Inman et al. | 248/636 X |
| 4,913,410 | 4/1990 | Marshall | 188/268 X |

FOREIGN PATENT DOCUMENTS

| | | |
|---|---|---|
| 7434119 | 2/1975 | Fed. Rep. of Germany. |
| 2920899 | 1/1981 | Fed. Rep. of Germany ... 15/250.31 |
| 677147 | 8/1952 | United Kingdom. |
| 2218622 | 5/1988 | United Kingdom. |

Primary Examiner—Allan D. Herrmann
Attorney, Agent, or Firm—Robert P. Seitter; J. Gordon Lewis

[57] ABSTRACT

A wiper system for motor vehicles is described in which a pivot-shaft assembly is fixed to the one end of a pipe-like carrier held by way of its other end on a stud of a motor carrier member stable in form. Wiper systems of this kind can also be produced at low costs for motor vehicles in which the assembly conditions are difficult.

20 Claims, 8 Drawing Sheets

WIPER SYSTEM

INTRODUCTION

The invention relates to a wiper system for an automotive vehicle.

BACKGROUND OF THE INVENTION

From the German petty patent DE-GM 74 34 119 a wiper system with a carrier is known, which carrier is formed as a square pipe and onto each end of which a pivot-shaft assembly is fixed. A plate which serves as a motor carrier member and onto which the drive motor of the wiper system is fixed is welded onto this square pipe. These wiper systems often called pipe frame systems have become very common during the last years because of their simple construction and great stability. However, it has been noticed that in comparison to the other known systems with founded frames of a aluminum pipe frame systems of this kind can be disadvantageous if in a motor vehicle there are narrow assembly conditions and if, therefore, this pipe connecting the pivot-shaft assemblies had to be deflected several times on different levels. In this case the deflecting effort is very big and stability of the frame is decreased. Furthermore it is of a disadvantage with respect to this known system that due to the welding process between the motor carrier member and the pipe-like carrier substantial costs incur, which, of course result in a higher price of the whole wiper system.

BRIEF DESCRIPTION OF THE INVENTION

The object of the present invention is to develop a wiper system of the kind mentioned at the beginning with a pipe-like carrier to a pivot-shaft assembly in such a way that by using easy means sufficient stability is achieved even in case of difficult assembly conditions.

This object is achieved according to the invention by plugging the other end of the pipe-like carrier onto a stud formed on the motor carrier member and fixing it onto this stud to form a stable structure.

Thus the invention is based on the idea that narrow space conditions can be used better, if the pipe-like carrier is fixed onto the motor carrier member in an axial direction, that is, if it is plugged onto a stud. As to a conventional wiper system with two pivot-shaft assemblies this means a division of the pipe-like carrier usual up to now into two parts each of which are plugged onto a stud on the motor carrier. Considering that with respect to the systems known so far the two pivot-shaft assemblies are fixed onto the ends of only one pipe and the motor carrier member is tangentially fixed onto this pipe, as to the embodiment according to the invention each pipe-like carrier is fastened on the motor carrier member on one side s that the whole carrier frame consists of two pipe portions and the motor carrier member itself.

On this occasion it must be noted that the present invention is not restricted to wiper systems in which two pivot-shaft assemblies are fixed onto pipe-like carriers. The basic idea can also be realized advantageously, if—for instance for rear window wiper systems of motor vehicles—there is only one pivot-shaft assembly that is axially plugged into the one pipe end, whereby in this case this pipe end, again, is axially plugged onto a stud on a motor carrier member and is fixed there to form a stable structure. Besides, embodiments are also possible in which only one pivot-shaft assembly is fixed onto a pipe, whereas the second pivot-shaft assembly is fastened to the motor vehicle in another way.

Stability of such a wiper system can substantially be improved by forming the studs on the motor carrier member in such a way that straight pipe-like carriers can be used. This is especially relatively simple, if the motor carrier member according to an especially preferred development of the invention is manufactured as a die-casting member of aluminum or zinc, for such a die-casting member can be formed in such a way without causing any higher costs that even in case of narrow assembly conditions, the wiper system can be assembled. Thereby this motor carrier member manufactured as a die-casting member can also be formed so that the pivot-shaft assemblies and the drive axis of the drive motor are situated on a straight line. The advantage thereof is that the phases of the two wipers during wiping operation are not varied. Furthermore, when using a die-casting member a fastening element, for instance a fastening eye, can be provided without any difficulty by way of which this motor carrier member can be fastened onto the car body of the motor vehicle.

The manufacturing costs of such a wiper system can substantially be reduced, if according to an advantageous development of the invention this motor carrier member is integrally formed with a part belonging to the drive motor. Thereby this motor carrier member can integrally be formed with the gear housing which is manufactured of zinc die-casting in most of the wiper motors anyway. However, the motor carrier member can also be part of the lid of the gear housing. After all, an embodiment is also possible, in which the gear housing is combined of two halfs preferably constructed in the same way whereby both halfs of the gear housing comprise studs onto which the pipe-like carriers can be fixed. Thus the possibilities of using such a motor with an integrated motor carrier member can considerably be increased.

In all these systems there is a connection between the drive motor and the pivot-shaft assemblies which is as strong and stable in form as possible, which pivot-shaft assemblies are fastened onto the car body of the motor vehicle. Thus in such systems the noises of the motor are transferred to the car body of the motor vehicle via the motor carrier member, the pipe-like carrier and the pivot-shaft assemblies. Many drivers regard this as disturbing. In order to get rid of these noises it is suggested assembling a noise dampening element between the drive motor and the pivot-shaft assemblies. This noise dampening element can be integrated especially into the pipe-like carrier by dividing each pipe-like carrier again into two parts and by connecting these two carrier parts via a noise dampening element. In some cases the transfer of the noise can also be reduced by perforating the pipe-like carrier and/or by filling it with noise dampening material. By weakening the material or by means of the noise dampening material the disturbing noises can be filtered in a certain frequency range, whereby this solution is preferred because the carrier's stability is guaranteed nevertheless. On this occasion it must be noted that independent protection is claimed for this idea of dampening the noise between the drive motor and the pivot-shaft assembly because this proposition can advantageously also be used in the known systems with a pipe connecting the two pivot-shaft assemblies.

BRIEF DESCRIPTION OF THE DRAWINGS

The invention and advantageous developments thereof are described by way of the embodiments illustrated in the drawing, in which.

DETAILED DESCRIPTION OF THE PREFERRED AND ALTERNATIVE EMBODIMENT OF THE INVENTION

Figure 1:
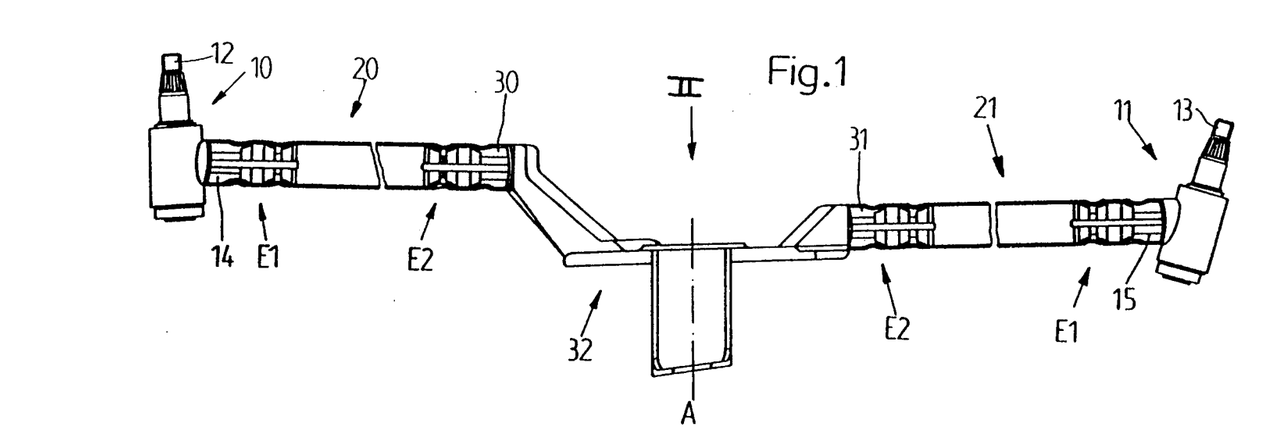
FIG. 1 is a lateral view of the carrier frame of a wiper system.

As to the wiper system only the elements which are important for the present invention are illustrated in the FIGS. 1 to 14. Two pivot-shaft assemblies are designated by 10 and 11, in which, as it is generally known, the wiper shafts 12 and 13 are rotatably mounted via bearing bushes. These pivot-shaft assemblies are made of zinc die-casting and integrally have a stud 14, 15 each, the structural form of which will be described in detail further on in context with the FIGS. 5 to 7. The wiper system comprises pipe-like carriers 20, 21 of a preferably circular cross-section. A stud 14, 15 each of a pivot-shaft assembly 10, 11 is plugged into the one end E1 of these pipe-like carriers 20, 21. Studs 30, 31 of a motor carrier member generally designated by 32 are plugged into the other end E2 of these pipe-like carriers 20, 21. Thus the carrier frame of this wiper system consists of two pipe-like carriers 20, 21 and of the motor carrier member 32, which is manufactured as a die-casting member of aluminum or of zinc. The pipe-like carriers 20, 21 are fixed stable in form onto the studs of the pivot-shaft assemblies o the motor carrier member. This will be described further on. The FIGS. 1 and 2 make clear that these pipe-like carriers 20, 21 are located on different levels, whereby the necessary displacement can be realized by the motor carrier member 32 formed respectively without any difficulty.

Figure 2:
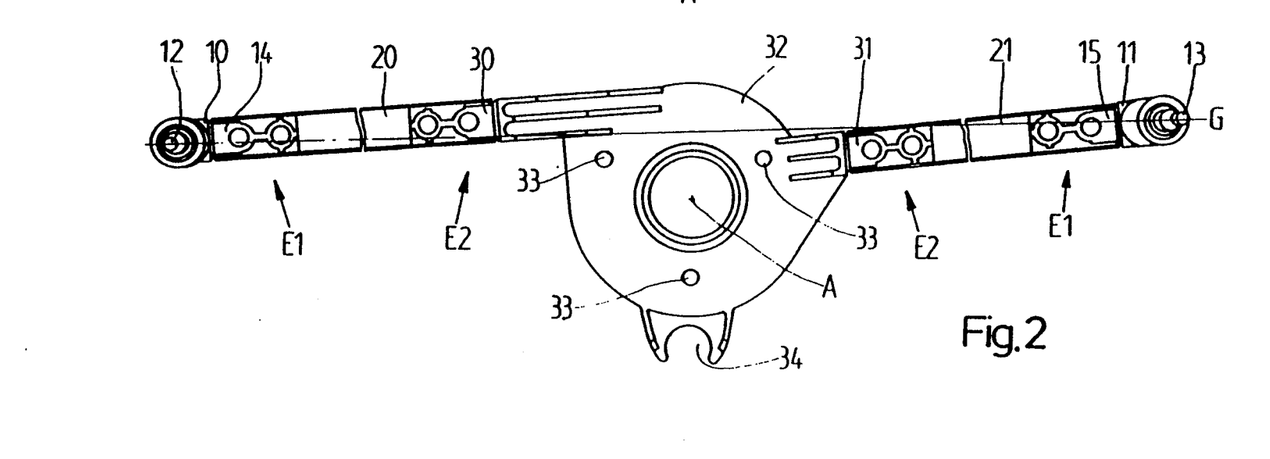
FIG. 2 is a view in the direction of arrow II in FIG. 1.
Figure 3:
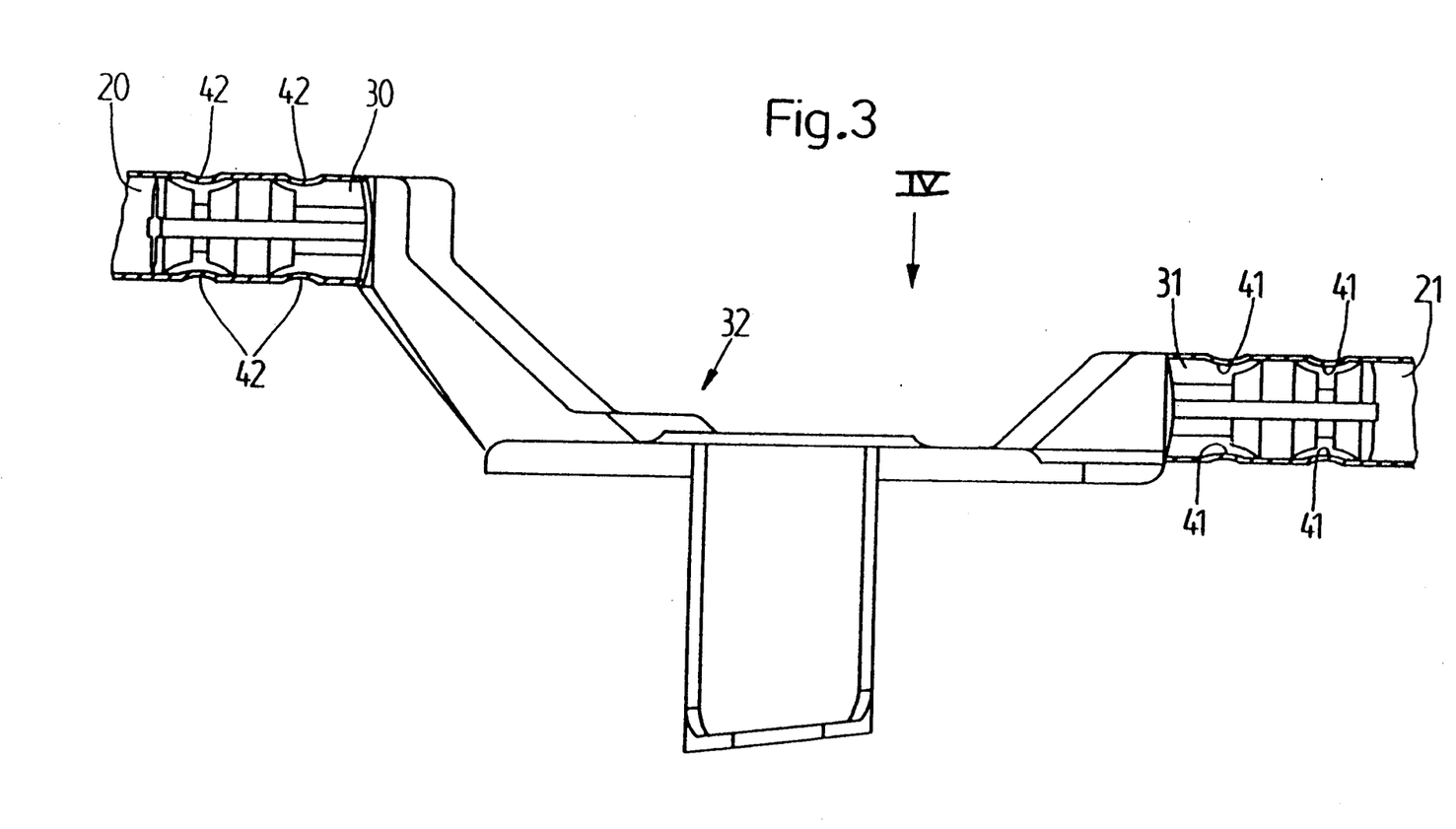
FIG. 3 is an enlarged lateral view of the motor carrier member.
Figure 4:
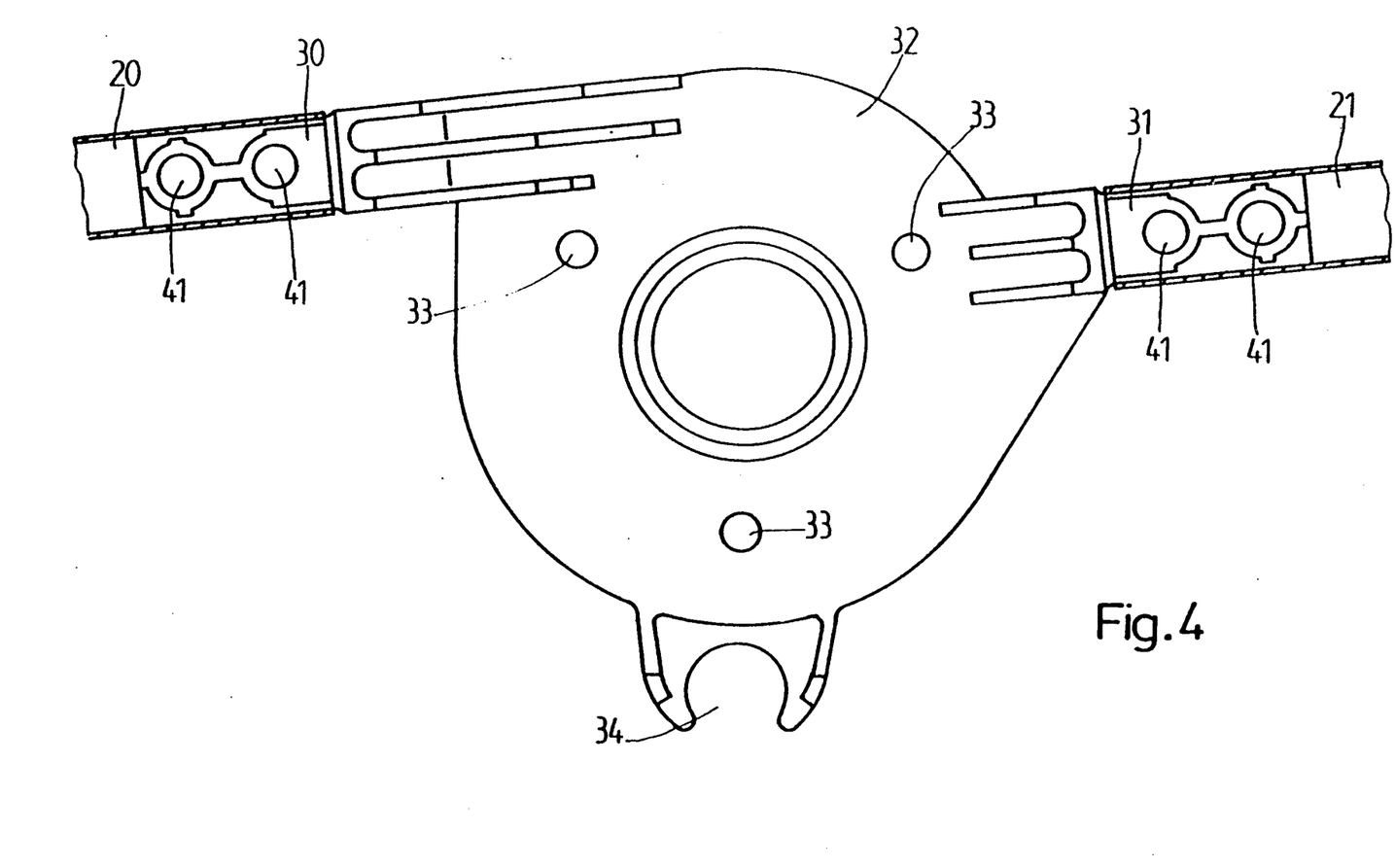
FIG. 4 is a view in the direction of arrow IV in FIG. 3.

In FIG. 2 fastening holes are designated by 33, onto which the actual drive motor of the wiper system is fixed by means of screwing. The driven axis of the drive motor extends along the line A. In FIG. 2 a straight line G connecting the two pivot-shaft assemblies 10, 11 with each other is indicated. It can be seen that the distance between this driven axis A of this motor and this straight line G connecting the pivot-shaft assemblies 10, 11 with each other is relatively small so that the phases between the wiping movements of the two wipers are not varied much. This is achieved by arranging the studs 30, 31 in the way as shown in FIG. 2. In this context it is important that the studs 30 31 are arranged in such a way that straight pipe-like carriers 20, 21 can be used. The advantage thereof is that no expensive deflecting processes are necessary and that, moreover, with respect to straight pipe-like carries stability of the connection meets all requirements.

Especially FIG. 2 makes clear that a fastening eye 34, manufactured as a die-casting member, is formed onto the motor carrier member 32, which fastening eye 34 can generally be regarded as a fastening element and by way of which this motor carrier member 32 can be fastened onto the car body of the motor vehicle not illustrated an further.

Figures 5, 6:
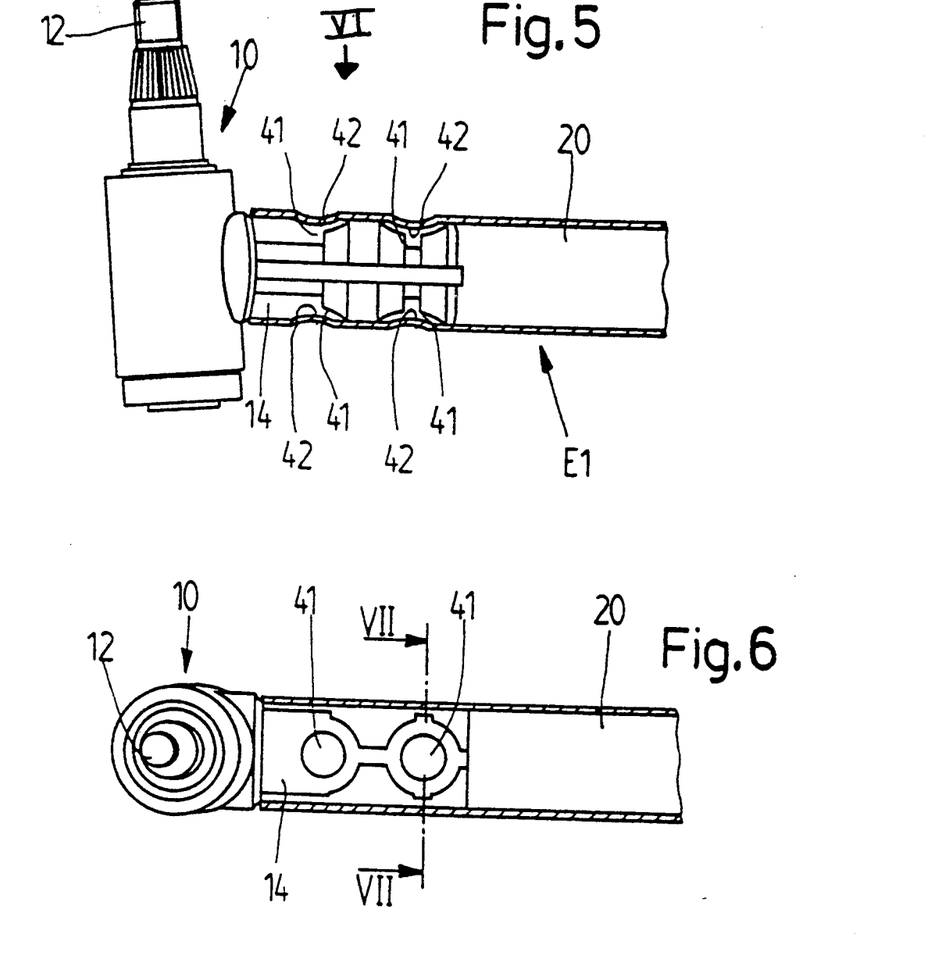
FIG. 5 is an enlarged section of a pipe-like carrier with a pivot-shaft assembly.
FIG. 6 is a view in the direction of arrow VI in FIG. 5.
Figure 7:
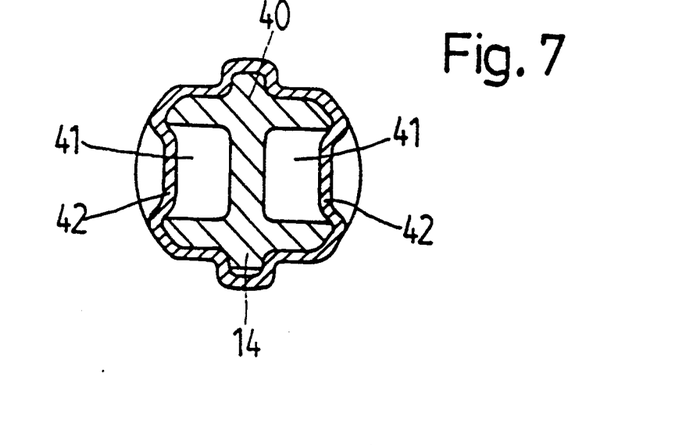
FIG. 7 is an enlarged cross-section taken along the line VII—VII in FIG. 6.

The studs 14, 15 on the pivot-shaft assembly and the studs 30, 31 on the motor carrier member are identically constructed to a large extent. FIGS. 5, 6 and 7 show that each stud comprises several recesses 41 each on both sides of a midway web 40. Pipe portions 42 of the pipe-like carrier 20 are pressed into these recesses 41 what can be seen especially in FIG. 7. Thus in the end portions E1, E2 the pipe-like carrier 20, 21 is deformed in such a way that in sections it adapts itself to the contour of the studs 14, 15 or 30, 31 which is not circular in this case. So a form-fitting connection between the studs and the pipe-like carriers is achieved. In this context it must be noted that this kind of form-fitting connection by deforming an outer part in correspondence to the contour of an inner part is known as such and is also already used in wiper systems, as it is made clear in the DE-PS 29 20 899. It is pointed out to this specification expressly so that no further explanations will be needed.

In the FIGS. 8 to 11 and 15 the drive motor 50 is illustrated. It comprises a gear housing (or gear housing portion) 51 closed by a lid (or second, complimentary gear housing portion) 52. In the embodiment according to the FIGS. 8 and 9 it is important that the studs 30, 31 are simultaneously integrally formed onto this gear housing 51 which can be manufactured of zinc die-casting, as it is generally known, onto which studs 30, 31 the ends E2 of the pipe-like carries 20, 21 are plugged. Thus as to these explanations the motor carrier member is integrally connected with the part to the drive motor 50, namely with the gear housing 51. This would also be the case, when leaving out the motor carrier member—at least as a separate member—in this embodiment and replacing it by a gear housing 51 of the drive motor 50 formed respectively.

Figure 8:
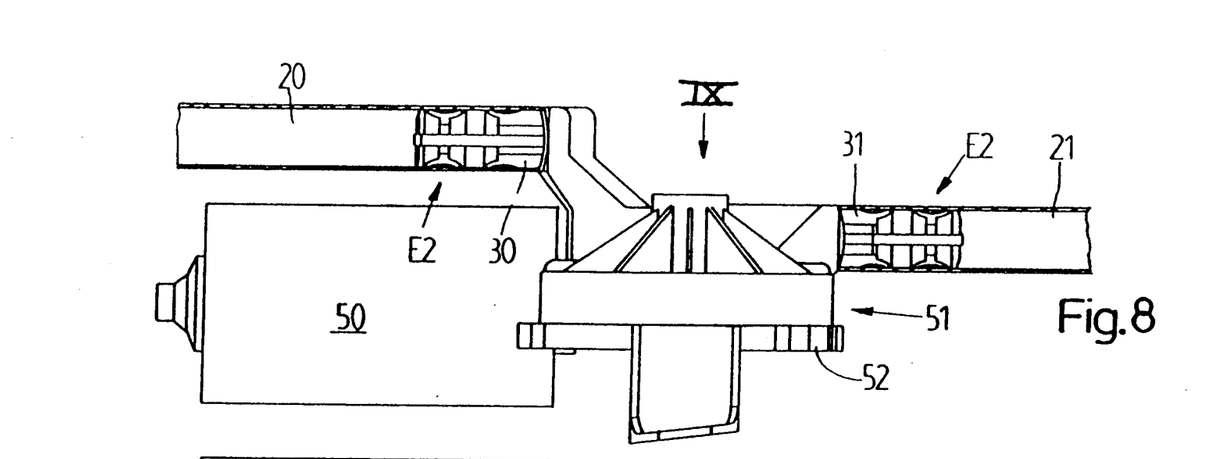
FIG. 8 is a lateral view of a motor carrier member in another embodiment.
Figure 9:
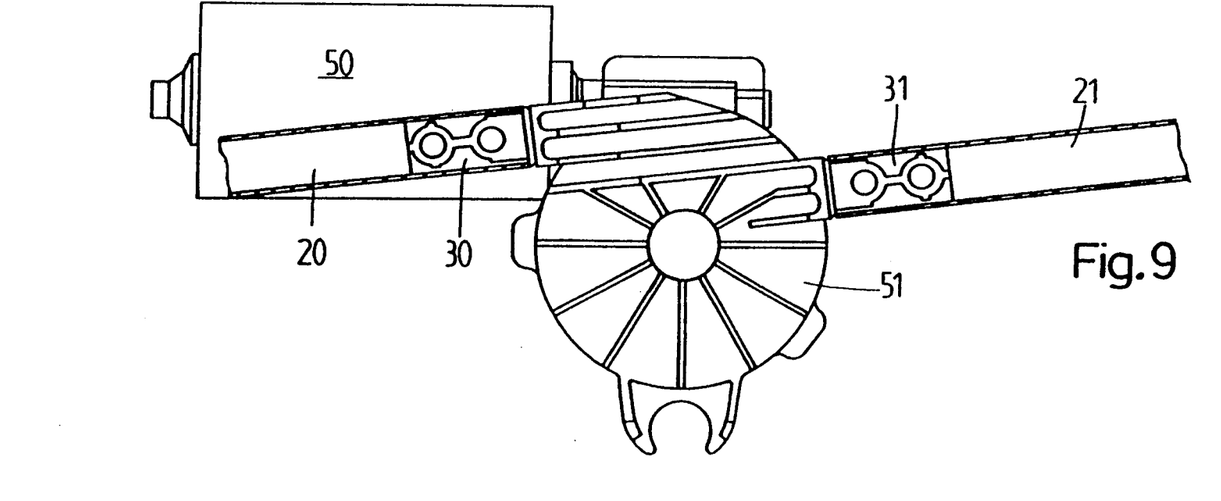
FIG. 9 is a view in the direction of arrow IX in FIG. 8.
Figure 10:
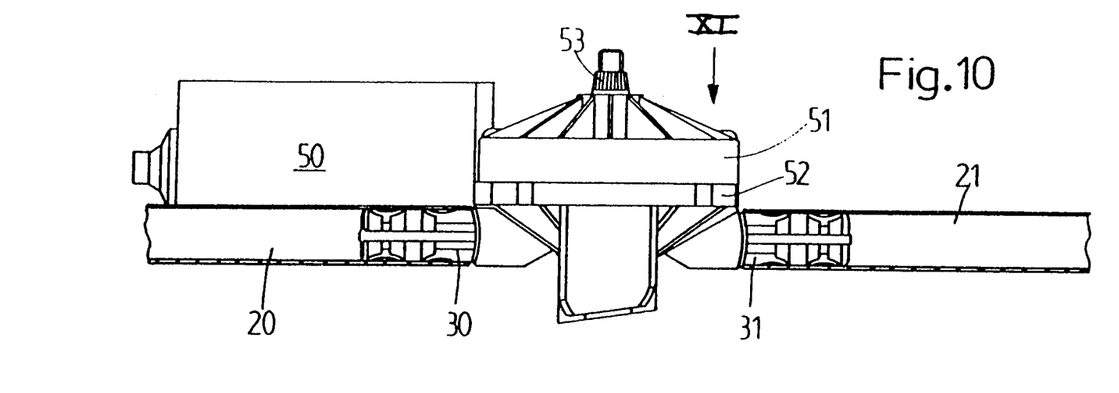
FIG. 10 is a lateral view of a motor carrier member of a third embodiment.
Figure 11:
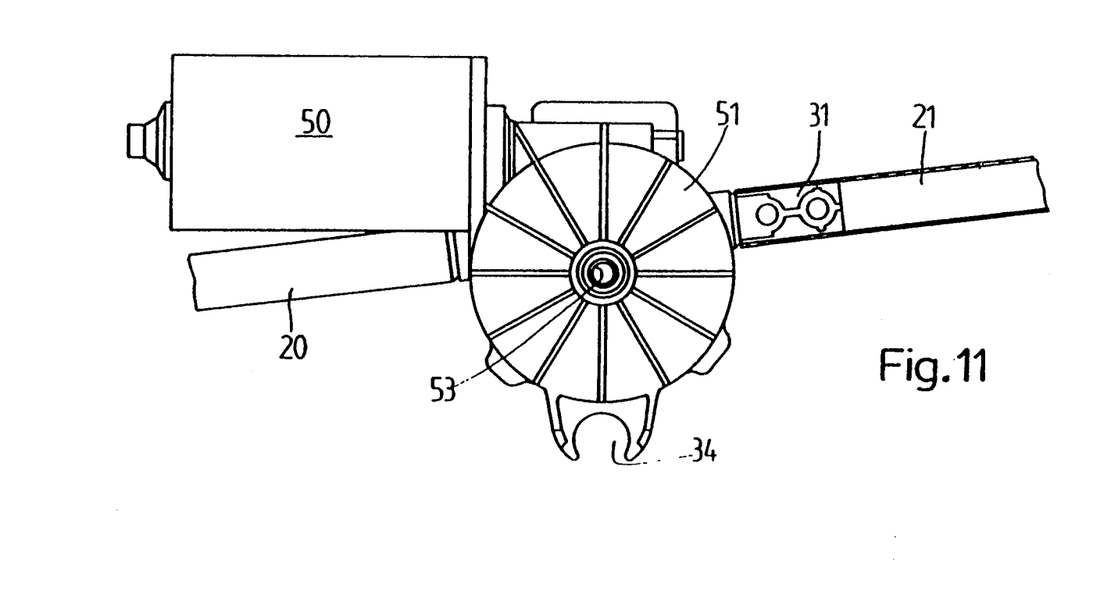
FIG. 11 is a view in the direction of arrow XI in FIG. 10.

The embodiment according to the FIGS. 10 and 11 differs from the embodiment according to the FIGS. 8 and 9 by forming these studs 30, 31 onto the lid 52 which is also formed as a die-casting member. This gear housing could also be combined of two halves of the gear housing preferably constructed in the same way, whereby each half of the gear housing should comprise such studs, so that this drive motor can universally be used in different wiper systems. In such an embodiment of two halfs of the gear housing constructed to a large extent identically the driven shaft 53 of the drive motor 50 can also be mounted better because in this case it can be mounted on both sides of the worm wheel normally connected with the driven shaft.

In short with respect to the explanations given so far it is again pointed out:

The carrier frame for a wiper system with two pivot-shaft assemblies consists of two pipe-like carriers and of an intermediate piece in the form of a motor carrier member connecting these pipe-like carriers. This motor carrier member is formed as a die-casting member and can thus simply be formed in such a way that following pipe pieces need not be deflected. Due to using straight pipes this carrier pipe is very stable regarding torsional forces. Due to using a die-casting member as an intermediate piece between the two straight pipe-like carriers wiper systems can be produced at low costs, which wiper systems can be mounted without any difficulty even in case of complicated assembly conditions. Thereby the two wiper shafts can directly be driven by a motor crank, whereby phase variations between the two wiping movements can be avoided to a large extent. The manufacturing costs of such a wiper system ar relatively low. The pivot-shaft assemblies manufactured of zinc die-casting need not be reworked at the fastening point of the pipe-like carrier. First of all the pipe-like carriers only have to be cut with respect to a certain length. The motor carrier member as a die-casting member is also directly injection-moulded in the form ready for use. All the parts are connected to each other by simply plugging them together, whereby afterwards the form-fitting connections are made preferably in only one operational step by deforming the pipe-like carriers without producing any shavings. In wiper systems of this kind it is relatively simple to change anything because often only the length of the pipe-like carrier has to be changed. By combining different pivot-shaft assemblies with different pipe-like carriers and different motor carrier members a building block system can be provided, by means of which nearly every problem of assembly can be solved, even then, when more than two pivot-shaft assemblies have to be connected with each other via a carrier frame.

In the embodiment illustrated in the drawing a pipe-like carrier of a circular cross-section is used because the position of the pivot-shaft assembly can be varied by twisting. In other embodiments, however, also square pipes could be used as carriers.

In the drawings only embodiments are illustrated in which two pivot-shaft assemblies are fixed stable in form onto a joint motor carrier member via two pipe-like carriers. The basic idea of the invention, however, can also be realized in wiper systems comprising only one pivot-shaft assembly which is fastened to a motor carrier member equipped with a respective stud via a pipe-like carrier. In the drawing only embodiments are illustrated in which the connection between the pipe-like carrier and the studs o the pivot-shaft assembly or on the motor carrier member is achieved by deforming the pipe-like carrier without any shavings. A stable interconnection between the pipe-like carrier and the stud on the motor carrier member, however, can also be achieved by riveting or screwing and the invention is not restricted to the embodiment which is illustrated in the drawing and which at present shows the best alternative. The basic idea of the invention can be realized by using a separate motor carrier member, but embodiments are preferred, in which there is not motor carrier member as a separate part and in which the studs for fixing the pipe-like rigid carriers are directly formed onto a component of the gear housing of the drive motor. Thus in such an embodiment the gear housing takes on an important function of the frame. Since this gear housing is manufactured of zinc die-casting, without additional efforts a fastening element, for instance a fastening eye, can be formed onto it so that no additional comments are needed for fixing the whole wiper system onto the car body.

A wiper system is thus provided, which wiper system meets all the requirements of stability and which, however, can be produced of few single parts at low costs.

Figure 12:
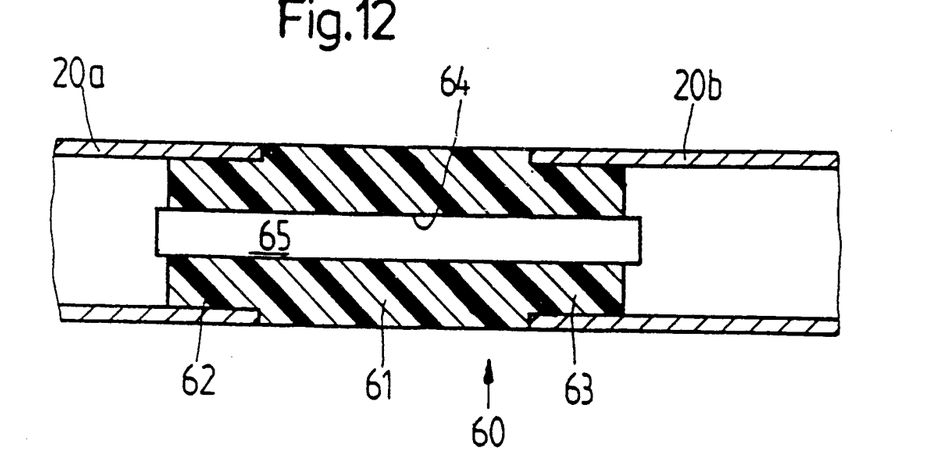
FIG. 12 is an enlarged partial section of a pipe-like carrier.
Figure 13:
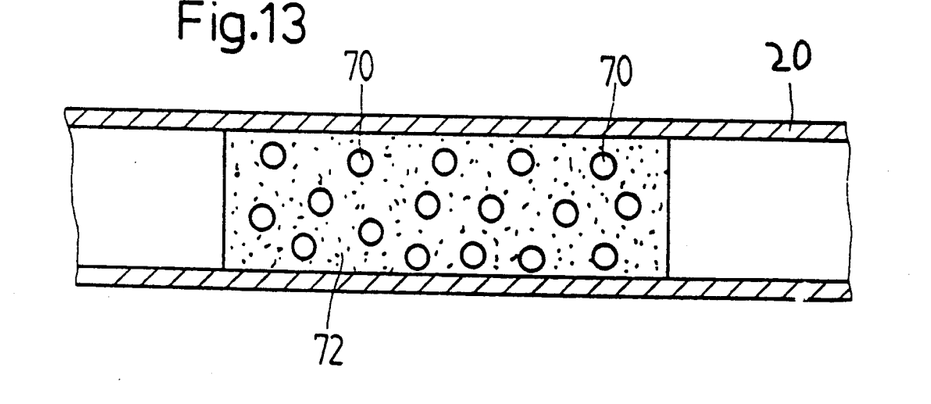
FIG. 13 is a partial section of another embodiment.
Figure 14:
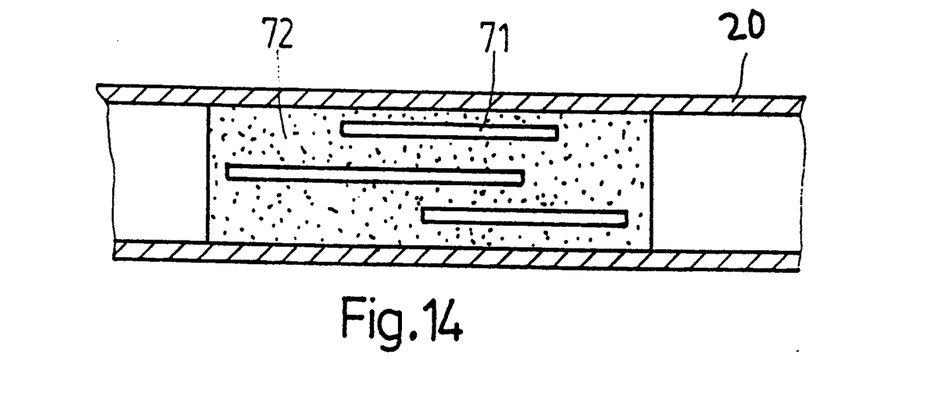
FIG. 14 is a partial section of a third embodiment of a pipe-like carrier.
Figure 15:
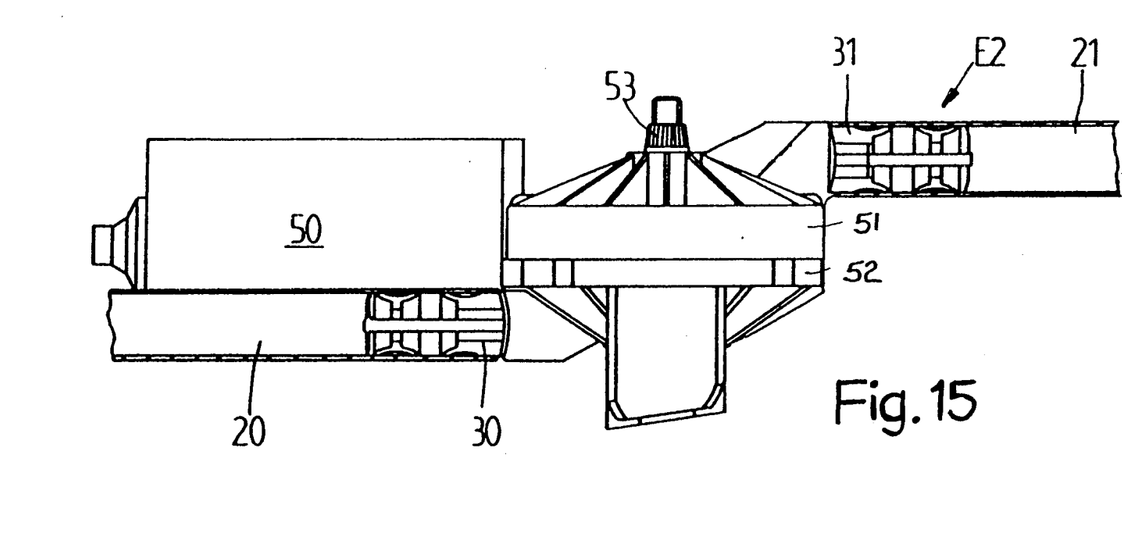
FIG. 15 is a lateral view of a motor carrier member of a fourth embodiment.

In the FIGS. 12 to 14 possibilities for dampening motor noises transferred via the frame to the pivot-shaft assemblies and then to the car body of the motor vehicle are indicated. In FIG. 12 two parts 20a, 20b of a pipe-like carrier 20 can be seen, which parts 20a, 20b are connected with each other by way of a intermediate piece 60. This intermediate piece 60 is made of a noise dampening, frequency filtering or noise absorbing material, for instance of plastics. It consists of a distance holder or spacer 61, from which studs 62, 63 depend at both sides, which studs 62, 63 are pressed into the pipe-like carriers 20a, 20b. For stiffening the system the distance holder 61 and the lateral studs 62, 63 can comprise a continual bore 64 for inserting a reinforcing pin 65. Thus in this embodiment a transfer of noises is substantially reduced by dividing the pipe-like carrier 20 into two parts and by putting an intermediate piece 60 serving as noise dampening element in between. In the FIGS. 13 and 14 alternatives are illustrated, whereby in these cases the noise dampening element 60 is achieved by perforating the pipe-like carrier 20. FIG. 13 shows an embodiment in which this pipe-like carrier 20 comprises round apertures 70 in a certain area In the embodiment according to FIG. 14 elongated apertures 71 are provided. In the area of this perforation 70, 71 the pipe-like carrier 20 is filled with noise absorbing material 72, for instance it is foamed. By this measure occurring resonance frequencies can be filtered to a large extent and thus can also be dampened so that they are not transferred to the car body. Of course, with respect to all these noise dampening measures it has to be taken care that the stability of the carrier frame is not unadmissably reduced.

What is claimed is:

1. A wiper system for motor vehicles comprising at least one pivot-shaft assembly fixed to one end of a pipe-like carrier, said carrier having another end which is rigidly connected to a motor carrier member for receiving a drive motor, wherein said another end of the pipe-like carrier is plugged onto a stud formed by said motor carrier member and is fixed thereto, said pipe-like carrier having a generally circular, uniform cross-section throughout the axial length thereof.

2. A wiper system according to claim 1, wherein the motor carrier member comprises a second stud onto which a second pipe-like carrier for a second pivot-shaft assembly is rigidly plugged.

3. A wiper system according to claim 2, wherein the studs are positionally disposed on the motor carrier member to effect substantial alignment of said pipe-like carriers.

4. A wiper system according to claim 1, wherein the motor carrier member is formed of die-cast material.

5. A wiper system according to claim 4, wherein the studs on the motor carrier member are positionally disposed to minimize spacing between a driven axis of the drive motor and a straight line connecting the pivot-shaft assemblies.

6. A wiper system according to claim 4, wherein the motor carrier member comprising a fastening element for fixing onto a body portion of an associated motor vehicle.

7. A wiper system according to claim 1, wherein each stud comprises at least one recess into which a pipe portion is pressed to establish a form-fitting connection.

8. A wiper system according to claim 7, wherein each pivot-shaft assembly also comprises a stud plugged into the respective pipe-like carrier.

9. A wiper system according to claim 1, wherein the motor carrier member is integrally formed with a part of the drive motor.

10. A wiper system according to claim 1, further comprising a noise dampening element disposed between the drive motor and the pivot-shaft assembly.

11. A wiper system according to claim 10, wherein the pipe-like carrier comprises said noise dampening element.

12. A wiper system according to claim 11, wherein the pipe-like carrier comprises perforated portions.

13. A wiper system according to claim 11, wherein the pipe-like carrier in sections is filled with noise dampening material.

14. A wiper system for motor vehicles comprising: at least one pivot-shaft assembly; a motor carrier member; and an elongated tubular carrier rigidly interconnecting said pivot-shaft assembly and motor carrier member by a system of outwardly extending studs formed thereon to form a substantially self-supporting structure, said tubular carrier having a generally circular, uniform cross-section throughout the axial length thereof.

15. A wiper system for motor vehicles comprising: at least one pivot-shaft assembly defining a first, generally outwardly directed stud portion; a motor carrier member adapted for mounting an electric motor to drive said wiper system, said member defining a second, generally outwardly directed stud portion; and an elongated tubular carrier including a first open end receiving said first stud portion therein to rigidly interconnect said tubular carrier and pivot-shaft assembly, and a second open end receiving said second stud portion therein to rigidly interconnect said tubular carrier and motor carrier member to form a substantially self-supporting structure, said tubular carrier having a generally circular, uniform cross-section throughout the axial length thereof.

16. A wiper system for motor vehicles comprising at least one pivot-shaft assembly fixed to one end of a pipe-like carrier, said carrier having another end which is rigidly connected to a motor carrier assembly including a carrier member and a drive motor, wherein said another end of the pipe-like carrier is plugged onto a stud formed by said motor carrier assembly and is fixed thereto said drive motor comprising a gear housing closed by a lid and wherein the carrier member is integrally formed with the gear housing.

17. A wiper system for motor vehicles comprising at least one pivot-shaft assembly fixed to one end of a pipe-like carrier, said carrier having another end which is rigidly connected to a motor carrier assembly including a carrier member and a drive motor, wherein said another end of the pipe-like carrier is plugged onto a stud formed by said motor carrier assembly and is fixed thereto, said rive motor comprising a gear housing closed by a lid wherein the lid is formed as a die-cast member and wherein the carrier member is integrally formed with the lid.

18. A wiper system for motor vehicles comprising at least one pivot-shaft assembly fixed to one end of a pipe-like carrier, said carrier having another end which is rigidly connected to a motor carrier assembly including a carrier member and a drive motor, wherein said another end of the pipe-like carrier is plugged onto a stud formed by said motor carrier assembly and is fixed thereto, said rive motor comprising a gear housing including two complimentary gear housing halves, wherein the carrier member is integrally formed with on half of the gear housing.

19. A wiper system according to claim 18, wherein both halves of the gear housing comprise studs for plugging the pipe-like carrier onto them.

20. A wiper system for motor vehicles comprising at least one pivot-shaft assembly fixed to one end of a pipe-like carrier, said carrier having another end which is rigidly connected to a motor carrier member for receiving a drive motor, wherein said another end of the pipe-like carrier is plugged onto a stud formed by said motor carrier member and is fixed thereto, wherein said pipe-like carrier is divided into two parts which are inter-connected by a noise dampening element.

* * * * *